INVENTORS
LESTER A. DINE
EDGAR S. LEMMEY

BY

ATTORNEYS

March 29, 1966 L. A. DINE ETAL 3,242,803
PROJECTOR WITH SLIDE GUIDE AND RETAINING MEANS
Filed April 29, 1964 2 Sheets-Sheet 2

INVENTORS
LESTER A. DINE
EDGAR S. LEMMEY
BY
ATTORNEYS

3,242,803
PROJECTOR WITH SLIDE GUIDE AND RETAINING MEANS
Lester A. Dine, 145 Grist Mill Lane, Great Neck, N.Y., and Edgar S. Lemmey, 56 Sterling Ave., Freeport, N.Y.
Filed Apr. 29, 1964, Ser. No. 363,414
6 Claims. (Cl. 88—26)

The present invention relates to slide projectors and particularly to projectors which are used for the viewing of slides or of X-ray pictures which may be mounted in different manners.

Two forms of slide mountings are particularly common, one form having a plurality of slides arranged in a mount, the width of which is substantially equal to the shorter dimension of the slide, the slides being arranged end to end with spaces therebetween and the other having a plurality of rows of slides arranged in various orientations in the slide mount.

Slide projectors are in general not adapted to the utilization of both types of mount and frequently it is impossible to utilize the second mentioned type of slide mount at all with such projectors since the slide guiding means is so arranged relative to the projection lens as to make it impossible to position slides in alignment therewith when the slide mount is materially wider than the short dimension of the individual slide utilized.

Our present invention provides a slide projector which makes it possible without adjustment or modification to project slides mounted in either one of the two types of mount discussed hereinabove.

It is an object of the invention to provide a slide projecting device which is capable of utilizing slides mounted in a variety of slide mounts without necessitating adjustment of any of the parts of the projecting device.

It is another object of the invention to provide a projector capable of projecting slides mounted in a single row mount or in a plural row mount the projector being adapted to guide the single row mount for positioning slides in sequence in projecting position, the guide means being moved out of the way and serving as a pressure plate when the slides to be projected are mounted in the plural row type of mount.

It is a further object of the invention to provide a projector as described above which is simply operated and which is likewise inexpensive to construct.

Other objects and features of the invention will be apparent when the following description is considered in connection with the annexed drawings, in which, FIGURE 1 is a perspective view taken from the right side of a slide projector in accordance with our invention;

Figure 1:
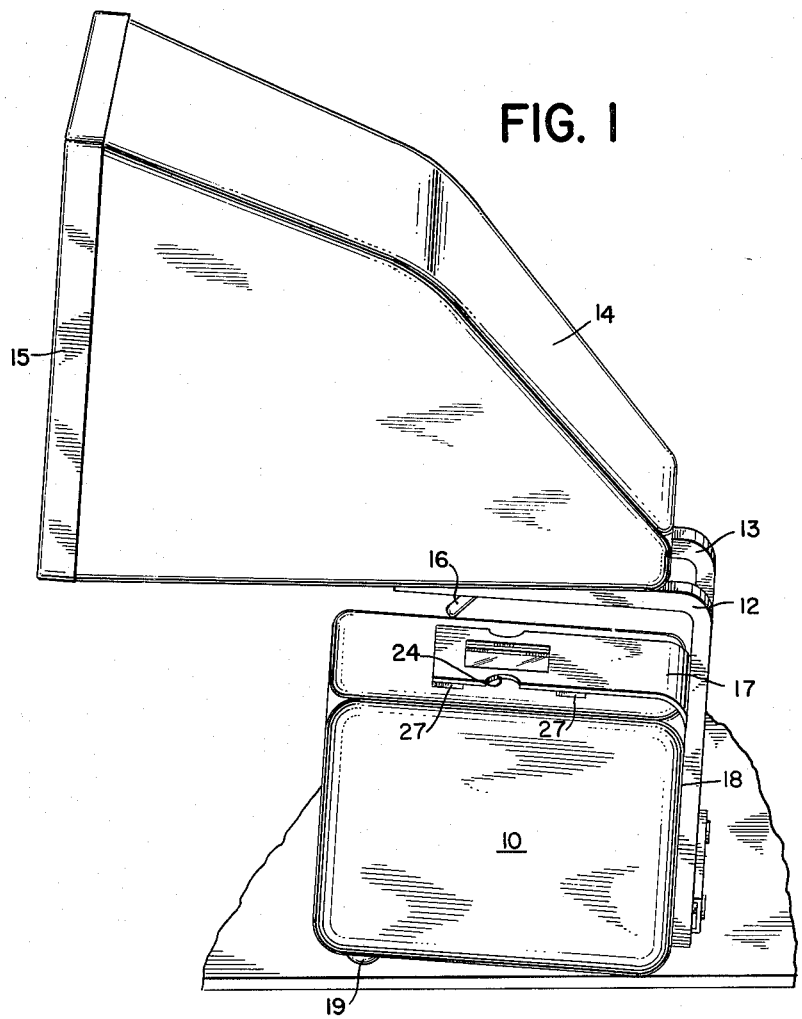
Figure 4:
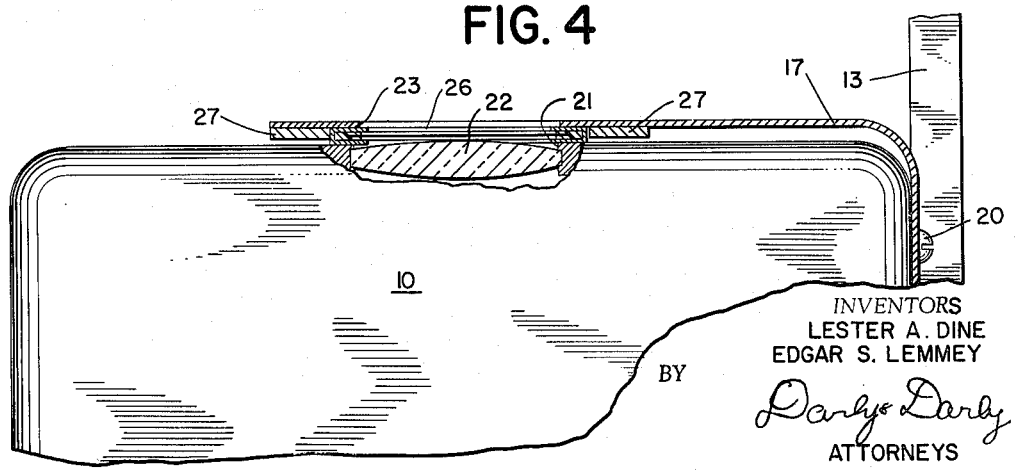
Figure 5:
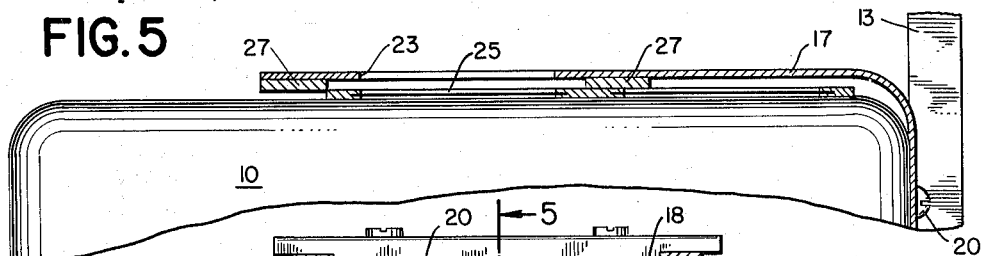
Figure 2:
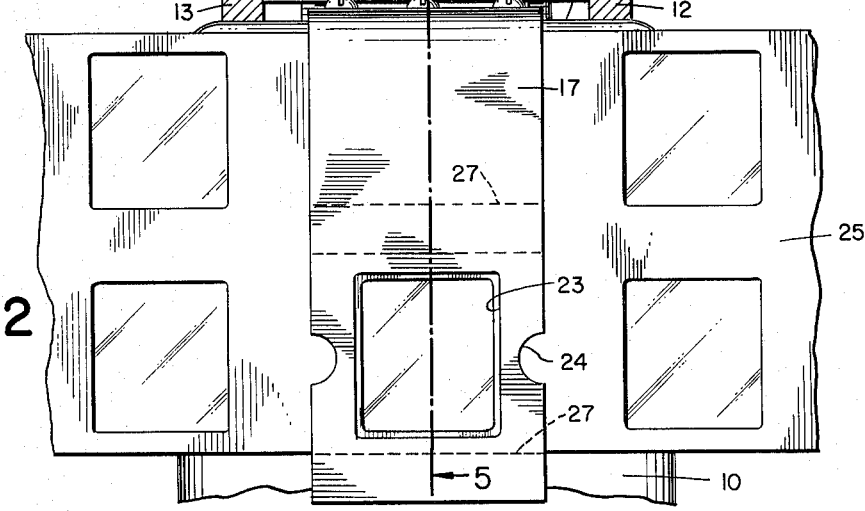
FIGURE 2 is a top plan view of a slide of the plural row type mounted in position to be projected.
Figure 3:
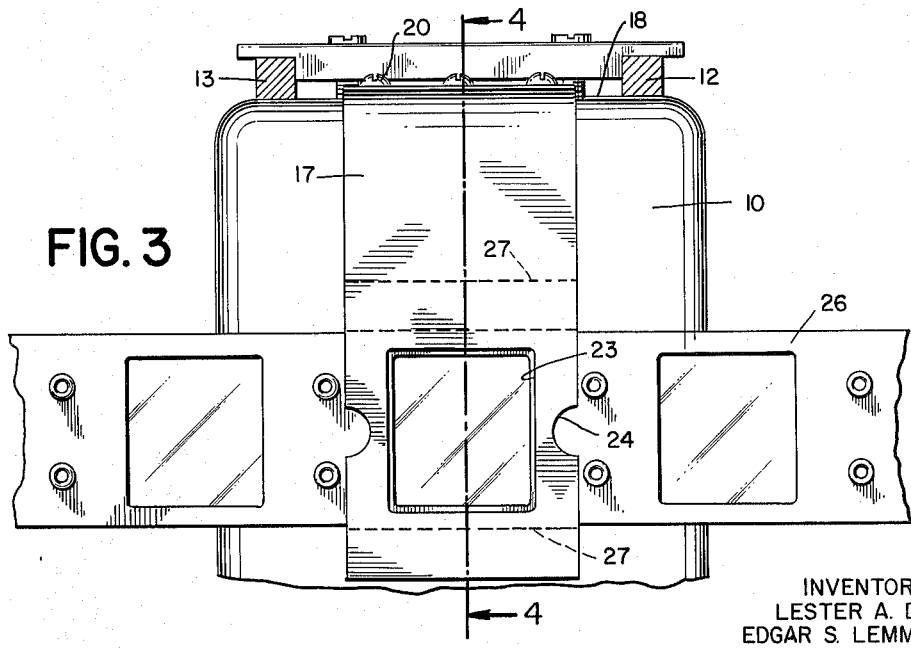
FIGURE 3 is a similar top plan view of the projector housing showing a single row slide mount in position for projection.

FIGURE 4 is a fragmentary side elevational view of the projector of FIGURE 1 showing the housing broken away and the slide guiding member in cross-section in order to illustrate the position of the slide guide relative to the condensing lens, the section is taken on the plane of the line 4—4 of FIGURE 3, and shows a single row slide mount in position; and FIGURE 5 is a view similar to FIGURE 4, taken on the plane of the line 5—5 of FIGURE 2 and showing a plural row slide mount in projection position.

Although not limited thereto our invention is shown in the drawings in connection with a projector of the type in which the image is projected on a ground glass or other transluscent screen from the rear with respect to the viewing point, a 45° mirror being interposed in the path of the light so that the light path extends generally vertically upward and thence forward horizontally to the viewing screen.

Referring now to the drawings and particularly to FIGURE 1, the projector comprises the usual housing 10 which contains a light source and a condensing lens. Mounted above the housing 10 by means of the supports 12 and 13 is a second housing 14 which contains a mirror, not shown, at its rearward end, this mirror being at substantially a 45° angle to light projected thereupon by a projection lens and serving to reflect the image to a transluscent screen such as a ground glass screen mounted at the forward end 15 of the housing 14.

As indicated, a projection lens is mounted in the housing 14 in the light path between the slide and the 45° mirror, this lens being adjustable in order to properly focus the image by means of a lever 16 which, in the usual manner, causes the lens to be moved closer to or further from the slide.

For convenience of viewing the device is arranged to be positioned at a slight angle to the horizontal supporting surface, this being accomplished by providing small feet 19 at the forward lower corners of housing 10.

Extending parallel to the upper surface of the housing 10 is a slide guiding member 17 which is fixed to the rear surface 18 of the housing 10 by means of screws 20, see FIGURE 3. The slide guide or more accurately the slide mount guide 17 extends forwardly over an opening 21 in the upper surface of the housing 10 lying immediately above the condensing lens 22. The member 17 has an opening 23 therein which conforms in shape to that of the opening 21 and to that of the slides to be used therewith.

In alignment with the center of this aperture 23 are finger notches 24 which provide means for grasping and removing the slide mount such as 25 (FIGURE 2) or 26 (FIGURE 3) from either side of the guiding member. The guide member 17 is also provided on its lower surface with two transversely extending strips 27 which strips are placed apart a distance equal to the width of a single row slide mount and which when such a slide mount 26 (FIGURES 3 and 4) is utilized form guide members so that the slide mount may readily be slid longitudinally into position to place a selected one of the slides therein in alignment with the apertures 21 and 23.

It will be noted that the member 17 is resilient so that when a single row mount is utilized the lower surface of the member 17 rests against the mount being held away from the upper portion of the housing due to the fact that the guide strips 27 are less thick than is the slide mount.

Referring now particularly to FIGURES 2 and 5, it will be seen that when it is desired to project one of the slides mounted in the plural row slide mount 25 the resilient guide 17 is raised so that the strips 27 rest upon the surface of the mount. With the resilient member thus positioned, the guide strips 27 bear upon the upper surface of the mount and press the mount against the housing so that the friction exerted makes it possible to retain the slide mount in an adjusted position with a selected slide in position for projection.

Thus this device makes it readily possible to project slides mounted in either of two common forms of slide mounts without requiring any adjustment while at the same time assuring that the slides are readily positionable into a desired position and overcomes the objections to prior devices of this same general character.

Furthermore, this device, as may readily be seen, is useful in the study of large transparencies such as X-ray film since the guiding arrangement holds the film in position so that small areas thereof can be observed.

While we have described a preferred embodiment of the invention, it will be understood that we wish to be limited not by the foregoing description, but solely by the claims granted to us.

What is claimed is:

1. In a slide projector for projecting slides mounted in plural slide mounts, in combination, a housing having a substantially horizontal upper portion with an aperture therein adapted to project light through slides mounted in slide mounts and positioned on said upper housing portion, and a slide mount guiding and retaining means fixed to a rear portion of said housing and projecting forwardly parallel to said upper housing portion, said guiding and retaining means being resilient and being biased toward said upper housing portion, said guiding and retaining means having a transverse dimension greater than the transverse dimension of a single slide.

2. A slide projector as claimed in claim 1, wherein said guiding means extends forwardly of said aperture and has an aligned aperture therein, said guiding means being substantially greater in its dimension transverse to said upper housing portion than is the transverse dimension of said aperture.

3. A device as claimed in claim 2 wherein said guiding and retaining means comprises a resilient strip having a substantially right angled bend therein at the rear thereof, said bent portion of said strip being fixed to the rear portion of said housing.

4. A device as claimed in claim 2 wherein guide strips are mounted on a lower surface of said slide mount guiding and retaining means, said guide strips extending transversely of said guiding means and being spaced apart a distance substantially equal to the smaller dimension of a single row slide mount.

5. A device as claimed in claim 4 wherein said transverse guide strips have a lesser thickness than that of a slide mount whereby the lower surface of said guiding and retaining means bears against a slide mount extending between said strips and presses said mount against said upper housing portion.

6. A device as claimed in claim 4 wherein said transverse guide strips serve as retaining means for a plural row slide mount, said strips resting upon the surface of the mount and exerting pressure against the mount to cause it to retain its position relative to the aperture in said guiding and retaining means and said upper housing portion.

References Cited by the Examiner

UNITED STATES PATENTS

| | | | |
|---|---|---|---|
| 2,457,915 | 1/1949 | Nemeth | 352—226 X |
| 2,754,722 | 7/1956 | Howell et al. | 88—28 |
| 2,863,356 | 12/1958 | Goldberg | 88—26 |

NORTON ANSHER, *Primary Examiner.*

V. A. SMITH, *Assistant Examiner.*